United States Patent
Levita

(10) Patent No.: US 8,514,985 B2
(45) Date of Patent: Aug. 20, 2013

(54) SYNCHRONISING A RECEIVER TO A SIGNAL HAVING KNOWN STRUCTURE

(75) Inventor: Candido Levita, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 733 days.

(21) Appl. No.: 12/670,552

(22) PCT Filed: Jul. 25, 2008

(86) PCT No.: PCT/GB2008/002552
§ 371 (c)(1),
(2), (4) Date: Jun. 14, 2010

(87) PCT Pub. No.: WO2009/013513
PCT Pub. Date: Jan. 29, 2009

(65) Prior Publication Data
US 2011/0122919 A1    May 26, 2011

(30) Foreign Application Priority Data
Jul. 26, 2007    (GB) .................................. 0714581.6

(51) Int. Cl.
*H03D 1/00*    (2006.01)
*H04L 27/06*    (2006.01)
(52) U.S. Cl.
USPC ........... 375/343; 375/145; 375/149; 375/356; 375/362; 370/342; 370/509
(58) Field of Classification Search
USPC .................. 375/343, 359, 362, 364–368, 145, 375/149; 370/342, 509–515; 369/47.14
See application file for complete search history.

(56) References Cited

U.S. PATENT DOCUMENTS 8,315,132 B1 * 11/2012 Yang et al. ................ 369/47.14
2008/0304607 A1 * 12/2008 Birru ............................ 375/359
2009/0141836 A1 * 6/2009 Shirakata et al. ............. 375/343

FOREIGN PATENT DOCUMENTS

| JP | 11-154925 | 6/1999 |
| JP | 2006-197375 | 7/2006 |
| WO | WO-2007066292 A2 | 6/2007 |

OTHER PUBLICATIONS

Chin Wee Yak et al.; "Timing Synchronization for Ultra-Wideband (UWB) Multi-Band OFDM Systems" Vehicular Technology Conference, 2005; VTC-2005-Fall. 2005 IEEE 62nd Dallas, TX, USA, Sep. 25-28, 2005, Piscataway, NJ, USA, IEEE, vol. 3, Sep. 25, 2005 (pp. 1599-1603, XP010878714; ISBN: 978-0-7803-9152-9 abstract; p. 1600, right-hand column; p. 1601, left-hand column, section D.
Japanese Office Action dated Feb. 21, 2012.

* cited by examiner

*Primary Examiner* — Phuong Phu
(74) *Attorney, Agent, or Firm* — RatnerPrestia

(57) ABSTRACT

Apparatus for locating a specific point in a received signal of cyclical nature, the apparatus comprising correlating means (16) for correlating the received signal with a code that is potentially present in the received signal, processing means (20,22,18) for multiplying the correlation result with a time-offset, complex-conjugated version of itself and filtering means (24,26,28) for low pass filtering the multiplication result to produce a signal suited to analysis for determination of said point and estimation of the frequency error.

17 Claims, 8 Drawing Sheets

| TFC1 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | + | + | + | + | + | + | + | + | + | + | + | + | + | + | + | + | + | + | + | - | - | - |
| Hopping sequence | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 |
| Preamble no. | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC2 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | + | + | + | + | + | + | + | + | + | + | + | + | + | + | + | + | + | + | + | - | - | - |
| Hopping sequence | 3 | 2 | 1 | 3 | 2 | 1 | 3 | 2 | 1 | 3 | 2 | 1 | 3 | 2 | 1 | 3 | 2 | 1 | 3 | 2 | 1 | 3 | 2 | 1 |
| Preamble no. | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC3 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | + | + | + | + | + | + | + | + | + | + | + | + | + | + | + | + | + | + | + | - | - | - |
| Hopping sequence | 1 | 2 | 3 | 3 | 3 | 1 | 1 | 1 | 2 | 2 | 3 | 3 | 3 | 1 | 2 | 2 | 3 | 3 | 1 | 1 | 2 | 2 | 3 | 3 |
| Preamble no. | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC4 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | + | + | + | + | + | + | + | + | + | + | + | + | + | + | + | + | + | + | + | - | - | - |
| Hopping sequence | 1 | 3 | 2 | 4 | 4 | 1 | 1 | 4 | 3 | 3 | 2 | 2 | 4 | 1 | 3 | 3 | 2 | 2 | 4 | 1 | 3 | 3 | 4 | 2 |
| Preamble no. | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC5 | | | | | | | | | | | | | | | | | | | | | | | | |
|---|---|---|---|---|---|---|---|---|---|---|---|---|---|---|---|---|---|---|---|---|---|---|---|---|
| Cover sequence | - | - | - | - | - | - | + | + | - | - | + | + | - | + | - | - | + | - | - | - | + | + | + | + |
| Hopping sequence | 1 | 5 | 5 | 5 | 5 | 5 | 5 | 5 | 5 | 5 | 5 | 5 | 5 | 5 | 5 | 5 | 5 | 5 | 5 | 5 | 1 | 1 | 1 | 5 |
| Preamble no. | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Figure 1a

| TFC6 | | | | | | | | | | | | | | | | | | | | | | | | |
|---|---|---|---|---|---|---|---|---|---|---|---|---|---|---|---|---|---|---|---|---|---|---|---|---|
| Cover sequence | - | - | - | - | - | - | - | - | - | + | + | - | + | - | - | + | - | - | + | - | + | + | + | + |
| Hopping sequence | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 | 2 |
| Preamble no. | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 | 6 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC7 | | | | | | | | | | | | | | | | | | | | | | | | |
|---|---|---|---|---|---|---|---|---|---|---|---|---|---|---|---|---|---|---|---|---|---|---|---|---|
| Cover sequence | - | - | - | - | - | - | - | - | - | - | + | - | - | + | - | - | + | - | - | + | - | + | + | + |
| Hopping sequence | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| Preamble no. | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 | 7 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC8 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | - | + | + | + | - | - | + | + | + | - | + | + | - | - | + | - | - | + | - | + | + | - |
| Hopping sequence | 1 | 2 | 1 | 2 | 1 | 2 | 1 | 2 | 1 | 2 | 1 | 2 | 1 | 2 | 1 | 2 | 1 | 2 | 1 | 2 | 1 | 2 | 1 | 2 |
| Preamble no. | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 | 8 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC9 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | - | - | + | - | - | - | + | + | - | + | + | + | - | - | + | + | + | + | + | + | - | - |
| Hopping sequence | 1 | 3 | 1 | 3 | 1 | 3 | 1 | 3 | 1 | 3 | 1 | 3 | 1 | 3 | 1 | 3 | 1 | 3 | 1 | 3 | 1 | 3 | 1 | 3 |
| Preamble no. | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 | 9 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

| TFC10 | | | | | | | | | | | | | | | | | | | | | | | | |
|---|---|---|---|---|---|---|---|---|---|---|---|---|---|---|---|---|---|---|---|---|---|---|---|---|
| Cover sequence | + | + | - | + | + | + | - | - | + | - | - | + | - | + | - | - | + | + | + | + | + | + | - | - |
| Hopping sequence | 2 | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 3 |
| Preamble no. | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| OFDM symbol | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |

Figure 1b

| Burst short preamble TFC1S | | | | | | | | | | | | |
|---|---|---|---|---|---|---|---|---|---|---|---|---|
| Cover sequence | + | + | + | + | + | + | + | + | + | - | - | - |
| Hopping sequence | 1 | 2 | 3 | 1 | 2 | 3 | 1 | 2 | 3 | 1 | 2 | 3 |
| Preamble no. | 1 | 1 | 1 | 1 | 1 | 1 | 1 | 1 | 1 | 1 | 1 | 1 |
| OFDM symbol | 1 | 2 | 3 | 4 | 5 | 6 | 7 | 8 | 9 | 10 | 11 | 12 |

| Burst short preamble TFC2S | | | | | | | | | | | | |
|---|---|---|---|---|---|---|---|---|---|---|---|---|
| Cover sequence | + | + | + | + | + | + | + | + | + | - | - | - |
| Hopping sequence | 1 | 3 | 2 | 1 | 3 | 2 | 1 | 3 | 2 | 1 | 3 | 2 |
| Preamble no. | 2 | 2 | 2 | 2 | 2 | 2 | 2 | 2 | 2 | 2 | 2 | 2 |
| OFDM symbol | 1 | 2 | 3 | 4 | 5 | 6 | 7 | 8 | 9 | 10 | 11 | 12 |

| Burst short preamble TFC3S | | | | | | | | | | | | |
|---|---|---|---|---|---|---|---|---|---|---|---|---|
| Cover sequence | + | + | + | + | + | + | + | - | + | - | + | - |
| Hopping sequence | 1 | 1 | 2 | 2 | 3 | 3 | 1 | 1 | 2 | 2 | 3 | 3 |
| Preamble no. | 3 | 3 | 3 | 3 | 3 | 3 | 3 | 3 | 3 | 3 | 3 | 3 |
| OFDM symbol | 1 | 2 | 3 | 4 | 5 | 6 | 7 | 8 | 9 | 10 | 11 | 12 |

| Burst short preamble TFC4S | | | | | | | | | | | | |
|---|---|---|---|---|---|---|---|---|---|---|---|---|
| Cover sequence | + | + | + | + | + | + | + | - | + | - | + | - |
| Hopping sequence | 1 | 1 | 3 | 3 | 2 | 2 | 1 | 1 | 3 | 3 | 2 | 2 |
| Preamble no. | 4 | 4 | 4 | 4 | 4 | 4 | 4 | 4 | 4 | 4 | 4 | 4 |
| OFDM symbol | 1 | 2 | 3 | 4 | 5 | 6 | 7 | 8 | 9 | 10 | 11 | 12 |

| Burst short preamble TFC5S | | | | | | | | | | | | |
|---|---|---|---|---|---|---|---|---|---|---|---|---|
| Cover sequence | - | - | - | + | + | - | - | + | - | + | + | + |
| Hopping sequence | 1 | 1 | 1 | 1 | 1 | 1 | 1 | 1 | 1 | 1 | 1 | 1 |
| Preamble no. | 5 | 5 | 5 | 5 | 5 | 5 | 5 | 5 | 5 | 5 | 5 | 5 |
| OFDM symbol | 1 | 2 | 3 | 4 | 5 | 6 | 7 | 8 | 9 | 10 | 11 | 12 |

Figure 2a

| Burst short preamble TFC6S | | | | | | | | | | | | |
|---|---|---|---|---|---|---|---|---|---|---|---|---|
| Cover sequence | - | - | - | + | + | - | - | + | - | + | + | + |
| Hopping sequence | 2 | 2 | 2 | 2 | 2 | 2 | 2 | 2 | 2 | 2 | 2 | 2 |
| Preamble no. | 6 | 6 | 6 | 6 | 6 | 6 | 6 | 6 | 6 | 6 | 6 | 6 |
| OFDM symbol | 1 | 2 | 3 | 4 | 5 | 6 | 7 | 8 | 9 | 10 | 11 | 12 |

| Burst short preamble TFC7S | | | | | | | | | | | | |
|---|---|---|---|---|---|---|---|---|---|---|---|---|
| Cover sequence | - | - | - | + | + | - | - | + | - | + | + | + |
| Hopping sequence | 3 | 3 | 3 | 3 | 3 | 3 | 3 | 3 | 3 | 3 | 3 | 3 |
| Preamble no. | 7 | 7 | 7 | 7 | 7 | 7 | 7 | 7 | 7 | 7 | 7 | 7 |
| OFDM symbol | 1 | 2 | 3 | 4 | 5 | 6 | 7 | 8 | 9 | 10 | 11 | 12 |

| Burst short preamble TFC8S | | | | | | | | | | | | |
|---|---|---|---|---|---|---|---|---|---|---|---|---|
| Cover sequence | + | + | - | - | + | + | + | + | + | + | - | - |
| Hopping sequence | 1 | 2 | 1 | 2 | 1 | 2 | 1 | 2 | 1 | 2 | 1 | 2 |
| Preamble no. | 8 | 8 | 8 | 8 | 8 | 8 | 8 | 8 | 8 | 8 | 8 | 8 |
| OFDM symbol | 1 | 2 | 3 | 4 | 5 | 6 | 7 | 8 | 9 | 10 | 11 | 12 |

| Burst short preamble TFC9S | | | | | | | | | | | | |
|---|---|---|---|---|---|---|---|---|---|---|---|---|
| Cover sequence | + | + | - | - | + | + | + | + | + | + | - | - |
| Hopping sequence | 1 | 3 | 1 | 3 | 1 | 3 | 1 | 3 | 1 | 3 | 1 | 3 |
| Preamble no. | 9 | 9 | 9 | 9 | 9 | 9 | 9 | 9 | 9 | 9 | 9 | 9 |
| OFDM symbol | 1 | 2 | 3 | 4 | 5 | 6 | 7 | 8 | 9 | 10 | 11 | 12 |

| Burst short preamble TFC10S | | | | | | | | | | | | |
|---|---|---|---|---|---|---|---|---|---|---|---|---|
| Cover sequence | + | + | - | - | + | + | + | + | + | + | - | - |
| Hopping sequence | 2 | 3 | 2 | 3 | 2 | 3 | 2 | 3 | 2 | 3 | 2 | 3 |
| Preamble no. | 10 | 10 | 10 | 10 | 10 | 10 | 10 | 10 | 10 | 10 | 10 | 10 |
| OFDM symbol | 1 | 2 | 3 | 4 | 5 | 6 | 7 | 8 | 9 | 10 | 11 | 12 |

SYNCHRONISING A RECEIVER TO A SIGNAL HAVING KNOWN STRUCTURE

REFERENCE TO RELATED APPLICATIONS

The present application is the U.S. national phase of PCT International Patent Application No. PCT/GB2008/002552, filed Jul. 25, 2008, published on Jan. 29, 2009, as WO 2009/013513 A1, which claims the benefit of GB. Patent Application No. 0714581.6, filed Jul. 26, 2007. The disclosure of the above-referenced applications are hereby incorporated by reference in their entireties into the present disclosure.

The WiMedia Alliance has proposed a standard radio platform for ultra-wideband (UWB) wireless networking.

According to the proposed standard, a receiver must lock with a transmitter by studying a time frequency code (TFC) that is sent out from the transmitter.

The proposed standard defines various TFCs. A TFC comprises a repeated frame of 24 OFDM (Orthogonal Frequency-Division Multiplexing) symbols. Each symbol is a train of 165 samples, each sample being transmitted as real only but being received as quadrature in nature (i.e. having in-phase (I) and quadrature-phase (Q) components) due to frequency error, channel distortion, etc. Located within each OFDM symbol is a preamble that takes up a block of 128 samples within the symbol, the remaining samples being zero. The preambles are pseudo-random sequences of samples.

Three approximately 0.5 GHz wide frequency bands are available for transmitting the TFCs. Each OFDM symbol of a TFC is transmitted in one of these bands. The sequence of frequency band allocations that are made for the OFDM symbols of a given TFC is known as the TFC's frequency hopping sequence or, for brevity, as its "hopping sequence". However, it should be remembered that the series of frequency band allocations for the OFDM symbols of a given TFC might all specify the same one of the three available frequency bands with the result that there is no frequency hopping as such.

Within a TFC, all of the OFDM symbols contain the same preamble albeit that the polarity of the preamble will differ between certain OFDM symbols. The sequence of the polarities of the preambles within a TFC is called the cover sequence. A point at which a cover sequence switches from positive to negative polarity shall be called an "inversion point" in this document. Different TFCs may be distinguished from each other through one or both of different frequency hopping sequences and different cover sequences. Additionally, each TFC has a different preamble. The TFCs defined in the proposed standard are shown in FIGS. 1 and 2. In both of these figures, one complete frame of each TFC is shown. When a TFC is transmitted, its frame is transmitted cyclically. The TFCs shown in FIG. 2 are used in the short-preamble, burst-mode communication and are labelled TFC1S to TFC10S, the suffix "S" indicating that the TFC is for short-preamble, burst-mode communication.

Looking at TFC1 and TFC2, for example, both TFCs have the same cover sequence wherein only the final three OFDM symbols have inverted polarity. The two TFCs have different preambles, with TFC1 using "preamble no. 1" and TFC2 using "preamble no. 2", and they have different hopping sequences. The frequency bands used in the hopping sequences are denoted 1, 2 and 3. In TFC1, successive OFDM symbols progress through the frequency band cycle 1-2-3 whereas in TFC2, the OFDM symbols cycle through the frequency bands in the order 1-3-2-1-3-2.

More information about TFCs can be obtained from the document "MULTIBAND OFDM PHYSICAL LAYER SPECIFICATION", MBOA/WiMedia Alliance, DRAFT 1.1.70 Dec. 7, 2006.

According to one aspect, the invention provides apparatus for locating a specific point in a received signal of a cyclical nature, the apparatus comprising correlating means for correlating the received signal with a code that is potentially present in the received signal, processing means for multiplying the correlation result with a time-offset, complex conjugated version of itself and filtering means for low pass filtering the multiplication result to produce a signal suited to analysis for determination of said point.

The invention also consists in a method of locating a specific point in a received signal of cyclical nature, the method comprising correlating the received signal with a code that is potentially present in the received signal, multiplying the correlation result with a time-offset, complex conjugated version of itself and low pass filtering the multiplication result to produce a signal suited to analysis for determination of said point.

The received signal could be a TFC and therefore the invention may be used to identify that TFC and a specific point in that TFC, which amounts to synchronising the receiver of the TFC with the equipment that transmitted the TFC.

The low pass filtering that is involved could be carried out using, for example, an IIR filter.

In certain embodiments, the filtering result is analysed to determine the specific point in the received signal. In certain embodiments, this analysis involves seeking a peak in the filtering result indicative of the presence of the code in the received signal. In certain embodiments, this analysis involves monitoring changes in a peak located in the filtering result in order to locate said point.

In certain embodiments, the time-offset between the inputs to the multiplication process is adjustable. This may permit selection of the particular type of received signal in which the search is performed.

In certain embodiments, the filtering that is performed includes a loop of adjustable length. This may permit selection of the particular type of received signal in which the search is performed.

In certain embodiments, DC component suppression is provided prior to the filtering. This can assist in reducing the effects of a tone interferer and can be implemented as a notch filter.

In certain embodiments, the invention is implemented in silicon, as part of a system on a chip.

By way of example only, certain embodiments of the invention will now be described, with reference to the accompanying drawings, in which:

FIG. 1 gives the format of ten TFCs;

FIG. 2 gives the format of ten short preamble, burst mode TFCs;

FIG. 3 is a block diagram illustrating apparatus for TFC detection;

FIG. 4 provides a series of snapshots of the output of the IIR filter that forms part of the apparatus of FIG. 3;

Figure 3:
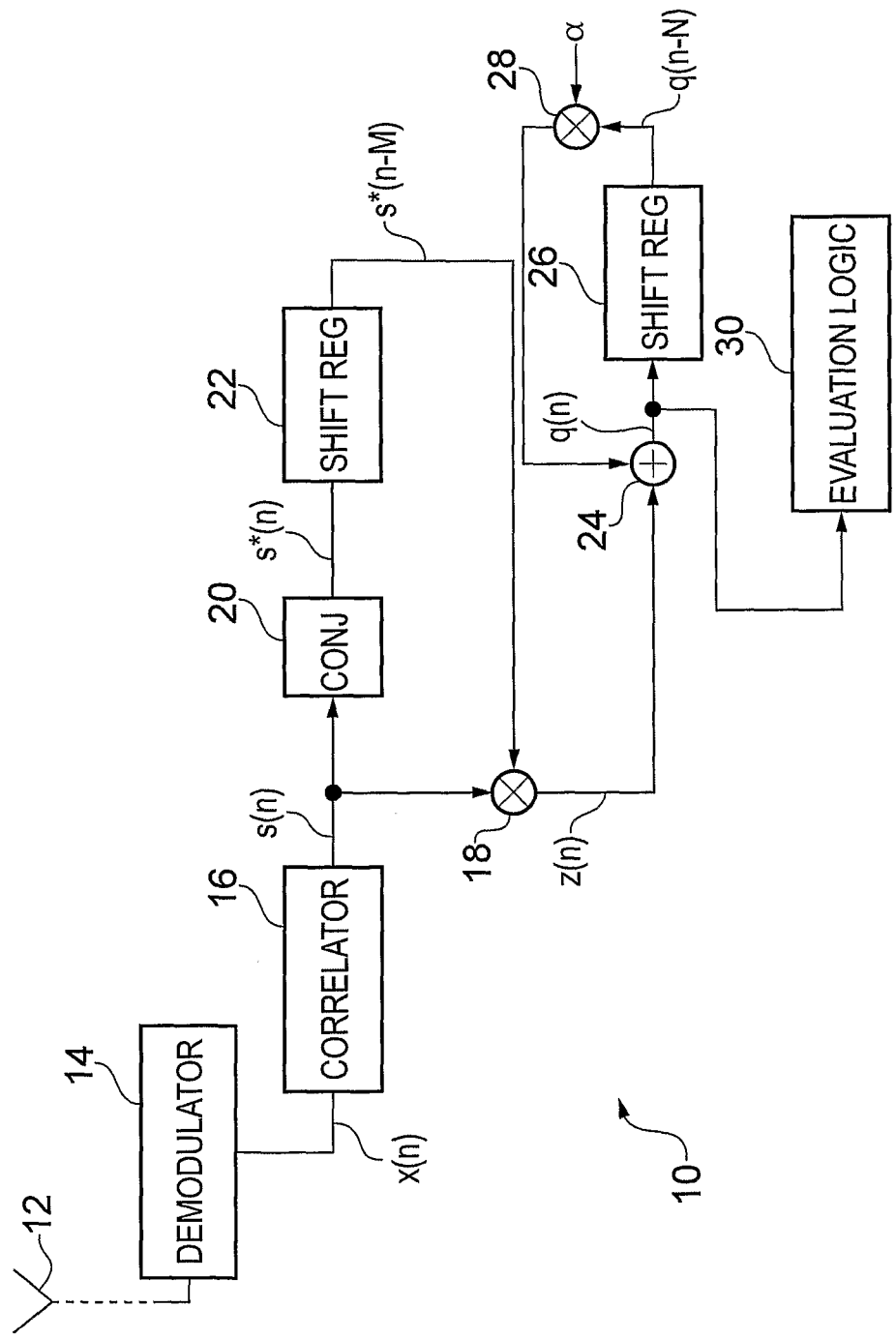

Acquiring a lock with a transmitter is a two stage process. First, the presence of a TFC must be detected ("TFC detection") and then a point within the TFC must be identified ("obtaining frame synch"). FIG. 3 shows a receiver 10 and, for clarity and brevity, illustrates only those elements that are most closely associated with the process of obtaining a lock to a TFC. The receiver 10 is implemented in silicon as part of a system on a chip (which typically also includes a transmitter).

Signals arriving at receiver 10 are acquired by an antenna 12. These signals are demodulated to baseband by demodulator 14. The nature of the demodulator 14 will depend upon the type of modulation scheme that is used in transmitting the signals and the skilled person will be able to choose a conventional demodulator design that is suitable for the particular modulation scheme that is being used.

As mentioned earlier, a TFC may hop amongst three different frequency bands during a frame. The demodulator 14 supplies a correlator 16 with a demodulated digital signal, x, that has been acquired from one of these frequency bands and which is potentially a TFC. Of course, the signal x, if it contains a TFC, will contain appreciable signal energy only in those OFDM symbols that correspond to occasions where the frequency band dictated by the hopping sequence matches the frequency band of signal x. In all other OFDM symbols, the signal x will contain just uncorrelated noise. For example, if TFC1 of FIG. 1 is acquired by the receiver 10 and the demodulator 14 tunes to frequency band 2 to produce signal x, then signal x will contain energy corresponding to preamble no. 1 in OFDM symbols 2, 5, 8, 11, 14, 17, 20 and 23 and just noise in the other OFDM symbol positions. Of course, in the case of TFCs 5 to 7 and 5S to 7S, signal x must be acquired by the demodulator 14 from the frequency band that is actually used by the TFC (there is no frequency hopping as such within each of these three TFCs).

The correlator 16 performs a sliding cross-correlation between x and one of the ten preambles, $b_j(m)$, where m=0 to 124 and j=1 to 10. Thus, for the $n^{th}$ sample in signal x, the correlator 16 performs the operation:

$$s(n) = \sum_{k=0}^{127} x(n-k) \cdot b_j(k)$$

Signal s produced by correlator 16 is provided to both a multiplier 18 and a conjugator 20. The conjugator 20 converts each sample of s into its complex conjugate. Therefore, the signal produced by conjugator 20 is s* (the "*" denotes complex conjugation).

The signal s* is provided to an M stage shift register 22. The effect of the shift register 22 is to delay signal s* by M cycles. Therefore, for the $n^{th}$ sample of signal s*, the output of the shift register 22 is s*(n−M). This signal is applied to the other input of multiplier 18 such that the multiplier performs the operation:

$$z(n)=s(n) \cdot s^*(n-M)$$

The set of values that M can take will be discussed later on.

The signal z is then applied to an infinite impulse response (IIR) filter constituted by an adder 24, a shift register 26 and a multiplier 28. In adder 24, the signal z is added to the output of multiplier 28 and then the result, signal q, is applied to the shift register 26. The shift register 26 has N stages.

The set of values that N can take will be discussed later on.

The output of shift register 26 is provided as one input of multiplier 28. The other input of multiplier 28 is a coefficient α whose value lies in the range 0<α<1 and which in this embodiment is selected from the values 0.75 and 0.625. The number of values of coefficient α and which one of those values is selected will depend on the amount of averaging (i.e., IIR filtering) being performed. That is to say, the more averaging it is performed, the lower the value of α should be. The output of the multiplier 28 provides the other input of the adder 24. Thus, the $n^{th}$ sample of signal q is given by:

$$q(n)=z(n)+\alpha \cdot q(n-N)$$

where q(n) becomes the lead entry in shift register 26 (which is currently occupied by sample q(n−1)) at the next cycle.

Signal q is also applied to evaluation logic 30. The evaluation logic 30 processes the signal q in blocks of N samples, hereinafter termed "evaluation blocks". The pattern of sample values with the evaluation blocks will evolve through successive blocks and it is a characteristic of this evolution that allows the receiver to obtain a timing lock with a transmitted TFC. The evaluation logic 30 applies a two phase assessment process to the evaluation blocks, as will now be discussed.

Consider the case where the receiver 10 is configured to detect a certain one of the TFCs and where that TFC is present (perhaps intermittently—due to the hopping sequence) in the signal that the demodulator 14 provides to the correlator 16. Under these conditions, a peak will appear in the evaluation blocks. The multiplication process at element 18 has the effect of boosting the height of the peak relative to the background noise (due to the constant time offset provided by element 22). The position of the peak is the same in each evaluation block due to the combination of the values of N and M and the hopping sequence of the TFC. The shape of the peak, however, varies from one evaluation block to the next and exhibits a cyclic behaviour with a period equal to the TFC frame length. Generally speaking, the height of the peak grows as this cycle progresses, until such time as an inversion point has an impact, whereupon a sharp drop occurs in the height of the peak. The sample in signal q that corresponds to this drop marks the end point of the OFDM symbol preceding the impacting inversion point. Signal q will show one such drop in the case that one of TFCs 1 to 4 and 8 to 10 is in use but will show two such drops in the case that one of TFCs 5 to 7 is being used. It will be apparent that, for certain TFCs, the number of such drops is less than the number of inversion points in the cover sequence. This is because the cover sequence of the TFC being used and the values of N and M conspire such that sometimes inversion points do not impact on signal q (i.e. do not cause signal z(n) to invert).

In assessing evaluation blocks, the evaluation logic 30 performs, as intimated earlier, a two phase process. In the first phase, the samples in the evaluation blocks are compared with a threshold. Once an evaluation block is detected that contains a peak exceeding this threshold, it is deemed that the TFC corresponding to the preamble used by correlator 16 is present in the signal x and the evaluation logic moves on to the second phase of the process. In the second phase, the evaluation logic 30 tracks the height of the peak from one evaluation block to the next. If the evaluation logic 30 detects that the height of the peak in the current evaluation block is less than, e.g., 70% (this is a programmable value) of the height of the peak in the previous evaluation block, then it is deemed that the position of the peak in the current evaluation block indicates the end of an OFDM symbol preceding an inversion point.

The particular values of M and N that are used are chosen depending on the TFC that is to be detected. The following table gives the values of M and N, in samples (it will be recalled that each OFDM symbol contains 165 such samples), that are used for the various TFC possibilities of FIG. 1.

TABLE 1

Values of M and N for each TFC

| TFC No. | M | N |
|---|---|---|
| 1 | 495 | 495 |
| 2 | 495 | 495 |
| 3 | 990 | 990 |
| 4 | 990 | 990 |
| 5 | 495 | 165 |
| 6 | 495 | 165 |
| 7 | 495 | 165 |
| 8 | 660 | 330 |
| 9 | 660 | 330 |
| 10 | 660 | 330 |
| 1S to 10S | 165 | 165 |

It is the selection of the correct values of M and N that gives rise to the behaviour that is seen in signal q when the TFC in question is present. If short preamble burst mode is being used, then M=N=165 irrespective of which TFC of FIG. 2 is in play.

In practice, both shift registers 22 and 26 have a length of six OFDM symbols (990 samples) and each has outputs at the 165, 330, 495, 660 and 990 sample points. For each of the shift registers, the outputs are input to a multiplexer which selects the relevant one of its inputs given the TFC that is being sought.

Figure 4:
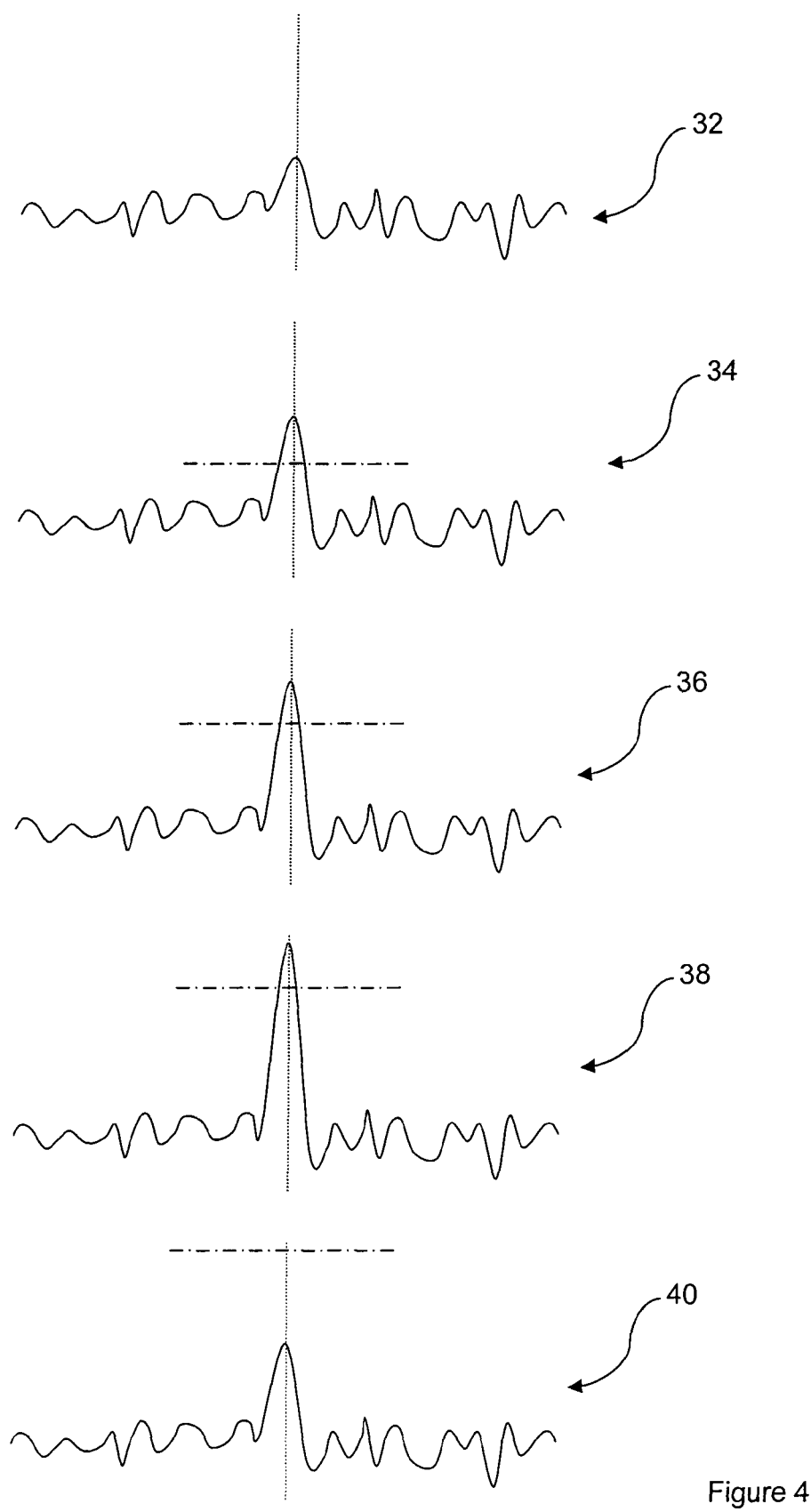

As a more concrete example, consider the case where the receiver 10 is attempting to detect TFC1 in the signal x, and that signal is acquired in this instance from frequency band 1. If TFC1 is present in signal x, then a peak will appear in successive evaluation blocks of the signal q and the shape of that peak will have a cyclic variation with a period of eight evaluation blocks. FIG. 4 shows plots of the samples of five consecutive evaluation blocks from this cycle. Let us assume that the evaluation logic 30 is operating in the second phase of its operation. In the plot of the first of these blocks, 32, a peak is apparent at the position indicated by the dotted vertical line. In the plot of the next block, 34, the peak has grown. In each of the latter four plots, the dotted horizontal line indicates the height of the peak in the preceding block. It will also be apparent that the position of the peak within the block does not vary from block to block. It will be apparent that the height of the peak increases further in the plot of the next block, 36, and yet further in the plot of the following block, 38. Then, in the plot of the next block, 40, it is seen that there is a large drop in the peak height relative to plot 38. This drop triggers the evaluation logic 30 to nominate the sample of signal q corresponding to the peak of plot 40 to be the sample at the end of OFDM symbol 21 of TFC1 because it is after this symbol that the inversion point occurs (see FIG. 1).

For the other TFCs, the same principle applies, although the number and position of cover sequence inversions might be different, leading in turn to slightly different behaviour in the evaluation blocks of the signal q. Depending on the TFC that is being tracked, there may be more than one drop in the height of the peak in the cycle of evaluation blocks of signal q. The following table illustrates where the peak drops occur:

TABLE 2

Position of peak drops for each TFC

| TFC | Where the positions of the dropped peaks specify the end points of TFC symbols . . . | |
|---|---|---|
| | Where x is derived from band #1 | Where x is derived from band #2 |
| 1 | 22 | 23 |
| 2 | 22 | 23 |
| 3 | 20 | 21 |
| 4 | 20 | 21 |
| 5 | 8 and 22 | Not possible |
| 6 | 8 and 22 | Not possible |
| 7 | 8 and 22 | Not possible |
| 8 | 19 | 20 |
| 9 | 19 | 20 |
| 10 | 19 | 20 |
| Burst mode, all TFCs | Short preamble: Programmable, but typically 10 Long preamble: Programmable, but typically 22 | |

It will be recalled that the convention adopted in this document numbers the first OFDM symbol of a TFC frame as 1 rather than 0.

The signal x is acquired from one of the three frequency bands, as mentioned earlier. The point in a TFC to which a dropped peak corresponds depends on which of these frequency bands is used for signal x. To illustrate this, table 2 contains two columns of peak positions (insofar as non-burst mode operation is concerned), one for the case where signal x is taken from frequency band 1 and the other for the case where signal x is taken from frequency band 2.

In burst mode, a transmitter can program the offset of the preamble within the OFDM symbols of the particular TFC that is being used. The value of this offset determines the precise position of the peaks in the analysis blocks of signal q, hence the reference to programmability in table 2.

Elements 16 to 30 of receiver 10 test signal x for the presence of a single TFC. To look for two TFCs simultaneously, the architecture of elements 16 to 30 can be duplicated with each of the two correlators applying a different preamble. Of course, this replication can be extended to enable a simultaneous search for all TFC options if so desired.

Figure 5:
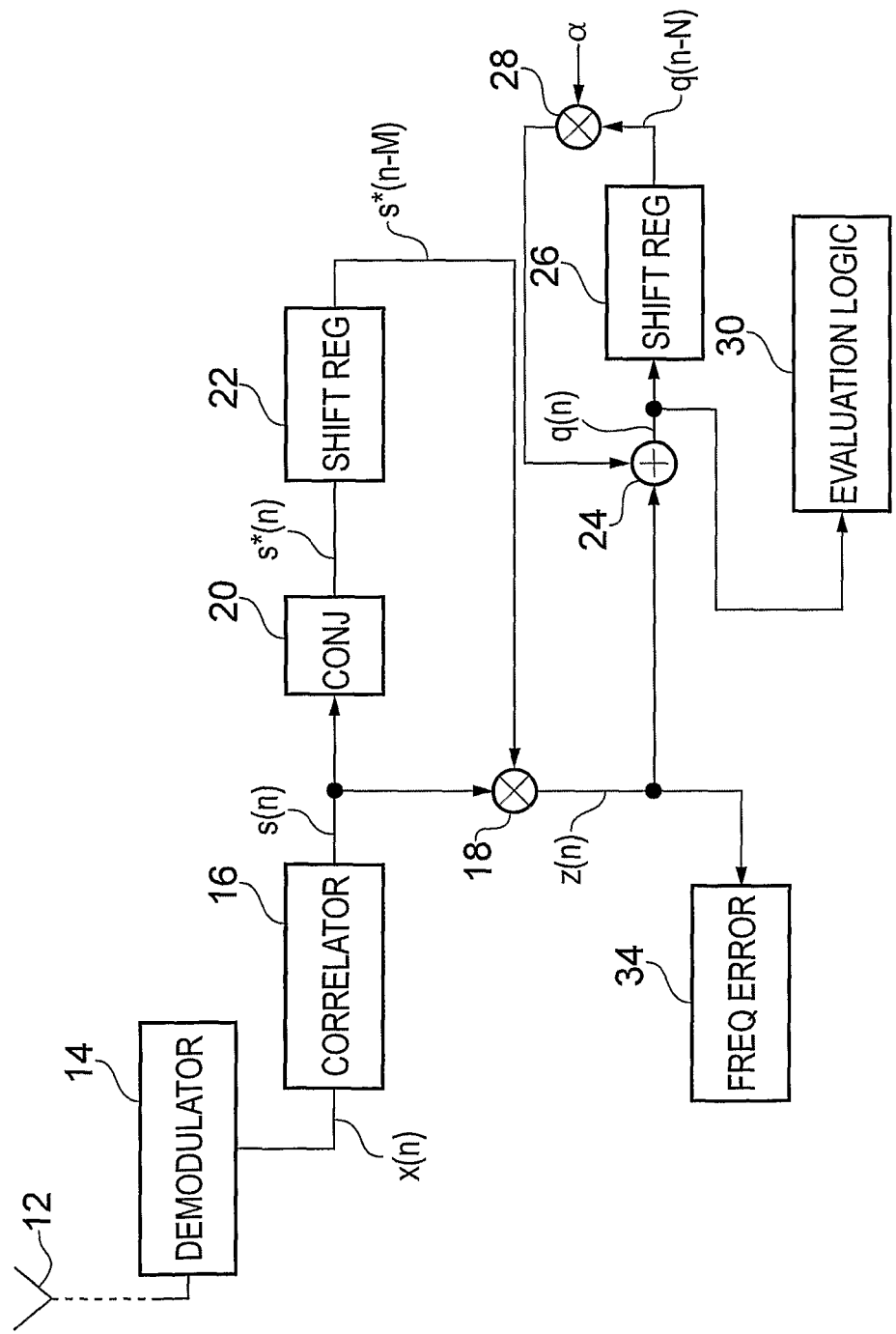
FIG. 5 is a block diagram of a variant of the apparatus of FIG. 3.

Signal z is created by multiplying signal s with a time offset version of its complex conjugate. This time offset is constant (for a given value of M), which means that signal z can be evaluated to determine the frequency error that exists in practice in the process of demodulating signal x from its carrier signal. FIG. 5 shows a variant of the embodiment of FIG. 3 in which the phase of signal z is measured. This phase measurement is performed in frequency error measurement unit 34. The phase error per clock cycle is a measure of the frequency error and can be used to correct demodulator 14. For example, consider the transmitted real preamble x(t) being received with a clock error of $e^{j\omega_e t}$ such that the received complex signal is $r(t)=x(t) \cdot e^{j\omega_e t}$ and the received signal after a constant time lag through the M active stages of shift register 22 is $r(t+\Delta T)=x(t) \cdot e^{j\omega_e(t+\Delta T)}$. Then it is easy to see that the complex conjugate multiplication of these two samples yields $z(n)=x^2 \cdot e^{-j\omega_e \Delta T}$ where x is a real signal and the phase $-\omega_e \Delta T$ is more or less constant and gives the estimate of the frequency error $\omega_e$ between the transmit and receive clocks. This phase is measured and averaged on the correlation peaks.

Figure 6:
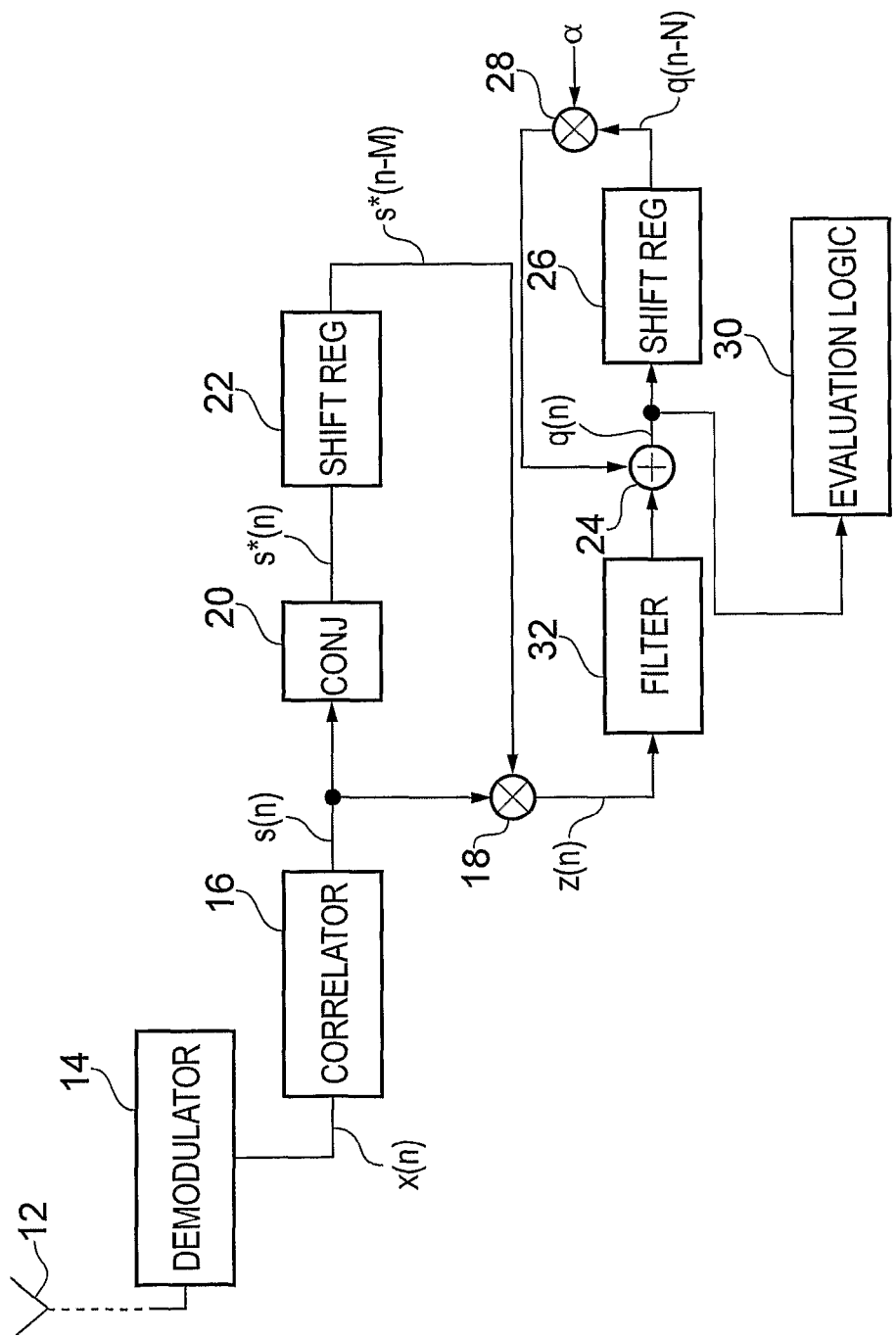
FIG. 6 is a block diagram of another variant of the apparatus of FIG. 3.

If an interfering tone were present in signal x, then that tone would be transformed into a complex DC offset by the multiplication process performed by element 18. Such a DC offset can cause numerical instability in the signal q (i.e., the value of q could potentially overflow). FIG. 6 shows a variant of the design wherein a DC notch filter 32 acts on signal z prior to the delivery of that signal to the IIR filter. The DC notch filter 32 functions to practically eliminate any DC component in signal z. A complex DC offset in signal z from a tone interferer would also upset the operation of the frequency error measurement unit 34 discussed with reference to FIG. 5 in that the unknown complex DC offset number would be added to the complex peaks which are used to estimate the frequency error. Accordingly, where frequency error measurement unit 34 and the notch filter are both to be used, the notch filter 32 should operate on signal z prior to its delivery to unit 34.

The invention claimed is:

1. Apparatus for locating a specific point in a received signal of cyclical nature, the apparatus comprising a correlator arranged to correlate the received signal with a code that is potentially present in the received signal, a multiplier arranged to multiply the correlation result with a time-offset, complex-conjugated version of itself and a filter arranged to low pass filter the multiplication result to produce a signal suited to analysis for determination of said point;
   wherein the time-offset used by the multiplier is adjustable; and
   wherein the filter is an IIR filter and includes a loop of adjustable length.

2. Apparatus according to claim 1, further comprising an assessor arranged to assess the filtering result to determine said point.

3. Apparatus according to claim 2, wherein the assessor is arranged to seek a peak in the filtering result indicative of the presence of the code in the received signal.

4. Apparatus according to claim 2, wherein the assessor is arranged to monitor changes in a peak located in the filtering result in order to locate said point.

5. Apparatus according to claim 4, wherein the assessor is arranged to detect a drop in the height of the monitored peak to locate said point.

6. Apparatus according to claim 4, wherein the assessor is arranged to detect a sequence of drops in the height of the monitored peak to locate said point.

7. Apparatus according to claim 1, further comprising a suppressor arranged to suppress a DC component in the multiplication result prior to its use by the filter.

8. Apparatus according to claim 1, further comprising a phase calculator arranged to assess the phase of the multiplication result as the basis of determining an error present in a frequency down-conversion process that is used to produce the received signal.

9. A UWB receiver comprising the apparatus of claim 1.

10. A method of locating a specific point in a received signal of cyclical nature, the method comprising correlating, using a correlator, the received signal with a code that is potentially present in the received signal, multiplying, using a multiplier, the correlation result with a time-offset, complex-conjugated version of itself and filtering, using a low-pass filter, the multiplication result to produce a signal suited to analysis for determination of said point;
   wherein the time-offset used in the multiplication step is adjustable; and
   wherein the filtering step is IIR filtering with a loop of adjustable length.

11. A method according to claim 10, further comprising the step of analysing the filtering results to determine said point.

12. A method according to claim 11, wherein the step of analysing the filtering result comprises seeking a peak in the filtering result indicative of the presence of the code in the received signal.

13. A method according to claim 11, wherein the step of analysing the filtering result comprises monitoring changes in a peak located in the filtering result in order to locate said point.

14. A method according to claim 13, wherein the step of monitoring changes in a peak comprises detecting a drop in the height of the monitored peak to locate said point.

15. A method according to claim 13, wherein the step of monitoring changes in a peak comprises detecting a sequence of drops in the height of the monitored peak to locate said point.

16. A method according to claim 10, further comprising suppressing a DC component in the multiplication result prior to its use in the filtering step.

17. A method according to claim 10, further comprising assessing the phase of the multiplication result as the basis of determining an error present in a frequency down-conversion process that is used to produce the received signal.

* * * * *

UNITED STATES PATENT AND TRADEMARK OFFICE
CERTIFICATE OF CORRECTION

PATENT NO.         : 8,514,985 B2                                     Page 1 of 1
APPLICATION NO.    : 12/670552
DATED              : August 20, 2013
INVENTOR(S)        : Levita It is certified that error appears in the above-identified patent and that said Letters Patent is hereby corrected as shown below:

In the Specification

Column 1, Line 9, delete "GB." and insert -- GB --, therefor.

Column 6, Line 59, delete " $=x^2 \cdot e^{-j\omega_e \Delta T}$ " and insert -- $=x^2 \cdot e^{-j\omega_e \Delta T},$ --, therefor.

In the Claims

Column 8, Line 17, in Claim 1, delete "HR" and insert -- IIR --, therefor.

Signed and Sealed this
Eighth Day of April, 2014

Michelle K. Lee
*Deputy Director of the United States Patent and Trademark Office*